(12) United States Patent
Nieh et al.

(10) Patent No.: US 9,037,657 B2
(45) Date of Patent: May 19, 2015

(54) SYSTEMS AND METHODS FOR PEER-TO-PEER BANDWIDTH ALLOCATION

(75) Inventors: Jason Nieh, New York, NY (US); Alexander Sherman, New York, NY (US); Clifford Stein, Tenafly, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 12 days.

(21) Appl. No.: 12/994,030

(22) PCT Filed: May 22, 2009

(86) PCT No.: PCT/US2009/044996
§ 371 (c)(1),
(2), (4) Date: Feb. 16, 2011

(87) PCT Pub. No.: WO2010/077379
PCT Pub. Date: Jul. 8, 2010

(65) Prior Publication Data
US 2011/0131278 A1    Jun. 2, 2011

Related U.S. Application Data

(60) Provisional application No. 61/055,917, filed on May 23, 2008, provisional application No. 61/214,107, filed on Apr. 20, 2009, provisional application No. 61/214,105, filed on Apr. 20, 2009.

(51) Int. Cl.
*G06F 15/16* (2006.01)
*H04L 29/08* (2006.01)

(52) U.S. Cl.
CPC ............ *H04L 67/104* (2013.01); *H04L 67/108* (2013.01); *H04L 67/1082* (2013.01)

(58) Field of Classification Search
None
See application file for complete search history.

(56) References Cited

U.S. PATENT DOCUMENTS 6,810,426 B2    10/2004   Mysore et al.
6,892,210 B1    5/2005    Erickson et al.
(Continued)

FOREIGN PATENT DOCUMENTS

WO    WO-2010077379 A1    7/2010

OTHER PUBLICATIONS

Ahsan Habib and John Chuang, "Service Differentiated Peer Selection: An Incentive Mechanism for Peer-to Peer Media Streaming", IEEE Transactions on Multimedia, vol. 8, Jun. 2006, 610-621.*

(Continued)

*Primary Examiner* — Lisa Lewis
*Assistant Examiner* — Henry Tsang
(74) *Attorney, Agent, or Firm* — Schwegman Lundberg & Woessner, P.A.

(57) ABSTRACT

Apparatus, systems, and methods can operate to provide efficient data transfer in a peer-to-peer network. A list of peer computers can be accessed and sorted by a data exchange metric. A requester peer is selected by traversing the list from a peer computer with a smallest data exchange metric to a peer computer with a largest data exchange metric to identify a peer computer with a pending data block request, the peer computer with the pending data block request being the requester peer and having an associated data exchange metric. A data block is then transmitted to the requester peer and the data exchange metric associated with the requester peer is updated to provide an updated data exchange metric for the requester peer. The list of peer computers can then be resorted. Additional apparatus, systems, and methods are disclosed.

17 Claims, 8 Drawing Sheets

(56) References Cited

U.S. PATENT DOCUMENTS

| | | | |
|---|---|---|---|
| 7,216,124 B2* | 5/2007 | Meaden | 1/1 |
| 7,343,418 B2 | 3/2008 | Herley | |
| 7,350,208 B1 | 3/2008 | Shoham | |
| 2002/0138576 A1 | 9/2002 | Schleicher et al. | |
| 2003/0236894 A1* | 12/2003 | Herley | 709/229 |
| 2005/0216559 A1 | 9/2005 | Manion et al. | |
| 2006/0007947 A1 | 1/2006 | Li et al. | |
| 2007/0028133 A1* | 2/2007 | Izutsu et al. | 714/4 |
| 2007/0130360 A1 | 6/2007 | Li | |
| 2008/0037527 A1 | 2/2008 | Chan et al. | |
| 2008/0098123 A1 | 4/2008 | Huang | |
| 2008/0133767 A1* | 6/2008 | Birrer et al. | 709/231 |
| 2008/0140853 A1* | 6/2008 | Harrison | 709/231 |
| 2008/0144621 A1 | 6/2008 | Huang et al. | |
| 2009/0182815 A1* | 7/2009 | Czechowski et al. | 709/206 |
| 2009/0198825 A1* | 8/2009 | Miller et al. | 709/230 |

OTHER PUBLICATIONS uTorrent Community Forums, 2007.*

"Limelight STREAM—Streaming Video & Audio", [online]. Copyright® 2010 Limelight Networks. Retrieved from the Internet: <URL: http://www.limelightnetworks.com/streaming-video-audio/>, (2010), 2 pgs.

"Octoshape Live Event Streaming", [online]. [archived Jan. 26, 2008]. Retrieved from the Internet: <URL: http://web.archive.org/web/20080126135136/http://www.octoshape.com/product/events.asp>, 2 pgs.

Howard, M., "IPTV Market Trends", Triple Play Symposium, Copyright © 2006 Infonetics Research, Inc., (2006), 11 pgs.

Miller, R., "CDN Market: $500M Now, $800M in 2008", [online]. [archived Dec. 12, 2007]. Retrieved from the Internet: <URL: http://www.datacenterknowledge.com/archives/2007/12/12/cdn-market-500m-now-800m-in-2008/>, (Dec. 12, 2007), 8 pgs.

Sherman, A., et al., "FairSteam: Improving Peer-to-Peer Streaming Performance through Fairness", *Technical Report CUCS-018-09*, (Apr. 2009), 1-15.

Sherman, A., et al., "FairTorrent: Bringing Fairness to Peer-to-Peer Systems", *Technical Report CUCS-011-09*, (Mar. 2009), 1-15.

"International Application Serial No. PCT/US2009/044996, Search Report mailed Jun. 4, 2010", 2 pgs.

"International Application Serial No. PCT/US2009/044996, Written Opinion mailed Jun. 4, 2010", 8 pgs.

Koo, S. G. M., et al., "A Resource-Trading Mechanism for Efficient Distribution of Large-Volume Contents on Peer-to-Peer Networks", Proceedings, 14th International Conference on Computer Communications and Networks (ICCCN 2005), 428-433.

* cited by examiner

| PEER | DEFICIT METRIC (IN KB) |
|---|---|
| PEER_8 | -128 |
| PEER_3 | -80 |
| PEER_14 | -32 |
| PEER_5 | 64 |
| ⋮ | ⋮ |
| PEER_n | 656 |

PROCEDURE RE-REQUEST
$LST = \text{GETURGENTBLOCKS}()$
for $b$ in LST do
    $last = now - \text{LASTREQUESTTIME(B)}$
    if $last >= request\_interval$ then
        $p_j = \text{SELECTBESTPEER}()$
        if $p_j \neq null$ then
            $\text{REQUESTFROMPEER}(p_j, b)$
        end if
    end if

PROCEDURE SENDTOPEER($p_j$, $b$)
if PEERHAS($p_j$,b) OR $b <$ PLAYPOSITION($p_j$) then
    $b =$ CHOOSERAREST($p_j$, $b$)
end if
$bytes =$ SENDBLOCK($p_j$, $b$)

*FIG. 10*

PROCEDURE SERVERREPLY($p_i$, $b$)
$b_{abs} =$ ABSOLUTERARESTBLOCK
if NUMCOPIES($b_{abs}$) $== 0$ then
    SENDBLOCK($p_i$, $b_{abs}$)
else
    SENDBLOCK($p_i$, $b$)
end if

*FIG. 11*

PROCEDURE SERVERREPLYOPT$(p_i, Sp_i, b)$
$b_{abs}$ = ABSOLUTERARESTBLOCK
if NUMCOPIES$(b_{abs})$== 0 then
    SENDBLOCK$(p_i, b_{abs})$
else
    $b_{alt}$ = RARESTBLOCK$(S_{pi})$
    if NUMCOPIES$(b_{alt})$== 0 then
        SENDBLOCK$(p_i, b_{alt})$
    else
        SENDBLOCK$(p_i, b)$
    end if
end if

*FIG. 12*

SYSTEMS AND METHODS FOR PEER-TO-PEER BANDWIDTH ALLOCATION

RELATED PATENT DOCUMENTS

This patent application is a nationalization under 35 U.S.C. 371 of PCT/US2009/044996, filed May 22, 2009 and published as WO 2010/077379 A1 on Jul. 8, 2010, which claims the benefit of priority under 35 U.S.C. §119(e) to U.S. Provisional Patent Application Ser. No. 61/055,917 filed on May 23, 2008 and entitled "Systems, Methods, and Media for Peer-to-Peer File Sharing"; U.S. Provisional Patent Application Ser. No. 61/214,107 filed on Apr. 20, 2009 and entitled "Fairstream: Improving Peer-to-Peer Streaming Performance Through Fairness"; and U.S. Provisional Patent Application Ser. No. 61/214,105 filed on Apr. 20, 2009 and entitled "Fairtorrent: Bringing Fairness to Peer-to-Peer Systems", the contents of which applications and publication are incorporated herein by reference in their entirety.

FIELD

The present application relates generally to computer networking and more particularly, but not by way of limitation, to managing peer-to-peer bandwidth allocation.

BACKGROUND

Peer-to-Peer (P2P) systems are growing in popularity. These types of systems may be used to share content between hundreds or even thousands of users. Such systems may share static content, such as a music file, or streaming content, such as a video feed. In contrast to a purely centralized distribution model, P2P distribution relies on the cumulative network resources of the peers in the network. In general, peers act as both clients and servers to one another—requesting and receiving data from one peer while serving and transmitting data to another. This cooperation is a fundamental advantage in a P2P system.

One problem that arises in P2P systems is a lack of fairness in bandwidth allocation. That is, some peers do not contribute service commensurate with what they receive, or vice versa. As a result, peers are disincentivized from contributing upload bandwidth and free-riders, those that receive data with little or no reciprocal contributions, become more prevalent. As a result, in limited bandwidth situations, peers throughout the P2P system will observe poor data transmission regardless of the contribution of any given peer. In addition, when the provisioning is low, the client can easily take all of the available upload bandwidth from the users who already contribute a lot, and cripple other network-bound processes running on the users' machines. In the other extreme, if users were allowed to configure their bandwidth contribution, without any incentive mechanism, P2P streaming systems would invite a lot of free-riding and degrade performance even further.

Free-riding, while a problem in P2P file-sharing systems, is even more significant in P2P streaming systems. While in most file-sharing systems users would prefer faster downloads, they may be satisfied with an eventual download completion. In contrast, when a user watches a stream in real-time, any drop in the download rate results in missed packets and decreased quality of the stream. Thus, for a system without an incentive mechanism, an increase in free-riding may result in poor quality for all users.

SUMMARY

This application describes systems and methods that provide effective data distribution in a peer-to-peer network and despite the presence of free-riders.

Example 1 describes a computer-implemented method comprising accessing a list of peer computers, the list sorted by a data exchange metric; selecting a requester peer by traversing the list from a peer computer with a smallest data exchange metric to a peer computer with a largest data exchange metric to identify a peer computer with a pending data block request, the peer computer with the pending data block request being the requester peer and having an associated data exchange metric; and transmitting a data block to the requester peer.

In Example 2, the method of Example 1 is optionally performed such that selecting the requester peer comprises determining whether the requester peer is able to receive the data block, and transmitting the data block comprises transmitting the data block to the requester peer when the requester peer is able to receive the data block.

In Example 3, the methods of any one or more of Examples 1 or 2 are optionally performed such that selecting the requester peer comprises maintaining a total amount of received data associated with each peer computer in the list of peer computers; and using the total amount of received data to select among a plurality of peer computers having equal data exchange metrics.

In Example 4, the methods of any one or more of Examples 1-3 are optionally performed such that using the total amount comprises selecting, from the plurality of peer computers having equal data exchange metrics, a peer computer having a largest total amount of transmitted data.

In Example 5, the methods of any one or more of Examples 1-4 are optionally performed such that the data exchange metric represents the difference between bytes sent to a peer computer and bytes received from the peer computer.

In Example 6, the methods of any one or more of Examples 1-5 are optionally performed comprising updating the data exchange metric associated with the requester peer to provide an updated data exchange metric for the requester peer; and resorting the list of peer computers.

In Example 7, the methods of any one or more of Examples 1-6 are optionally performed such that updating the data exchange metric comprises adjusting the data exchange metric by the size of the data block transmitted to the requester peer.

In Example 8, the methods of any one or more of Examples 1-7 are optionally performed such that resorting the list of peer computers comprises removing the requester peer from the list; and inserting the requester peer into the list based on the updated data exchange metric.

In Example 9, the methods of any one or more of Examples 1-8 are optionally performed comprising determining whether the requester peer already has a data block corresponding to the pending data block request; and selecting an alternative data block to transmit to the requester peer when the requester peer already has the data block corresponding to the pending data block request.

In Example 10, the methods of any one or more of Examples 1-9 are optionally performed such that selecting the alternative data block comprises identifying a rare data block.

In Example 11, the methods of any one or more of Examples 1-10 are optionally performed comprising determining whether a playback position of the requester peer is beyond a sequence number of a data block corresponding to the pending data block request; and selecting an alternative data block to transmit to the requester peer when the playback position of the requester peer is beyond the sequence number of the data block corresponding to the pending data block request.

In Example 12, the methods of any one or more of Examples 1-11 are optionally performed such that selecting the alternative data block comprises identifying a rare data block.

Example 13 describes a system comprising a memory; and a control module coupled to the memory, the control module configured to: access a list of peer computers, the list sorted by a data exchange metric; select a requester peer by traversing the list from a peer computer with a smallest data exchange metric to a peer computer with a largest data exchange metric to identify a peer computer with a pending data block request, the peer computer with the pending data block request being the requester peer and having an associated data exchange metric; and transmit a data block to the requester peer.

In Example 14, the system of Example 13 is optionally configured such that the control module is configured to select the requester peer by determining whether the requester peer is able to receive the data block, and transmit the data block by transmitting the data block to the requester peer when the requester peer is able to receive the data block.

In Example 15, the system of any one or more of Examples 13 or 14 are optionally configured such that wherein the control module is configured to select the requester peer by: maintaining a total amount of received data associated with each peer computer in the list of peer computers; and use the total amount of received data to select among a plurality of peer computers having equal data exchange metrics.

In Example 16, the system of any one or more of Examples 13-15 are optionally configured such that the control module is configured to use the total amount by selecting, from the plurality of peer computers having equal data exchange metrics, a peer computer having a largest total amount of transmitted data.

In Example 17, the system of any one or more of Examples 13-16 are optionally configured such that the data exchange metric represents the difference between bytes sent to a peer computer and bytes received from the peer computer.

In Example 18, the system or any one or more of Examples 13-17 are optionally configured such that the control module is configured to: update the data exchange metric associated with the requester peer to provide an updated data exchange metric for the requester peer; and resort the list of peer computers.

In Example 19, the system or any one or more of Examples 13-18 are optionally configured such that the control module is configured to update the data exchange metric by adjusting the data exchange metric by the size of the data block transmitted to the requester peer.

In Example 20, the system of any one or more of Examples 13-19 are optionally configured such that the control module is configured to resort the list of peer computers by: removing the requester peer from the list; and inserting the requester peer into the list based on the updated data exchange metric.

In Example 21, the system of any one or more of Examples 13-20 are optionally configured such that the control module is configured to: determine whether the requester peer already has a data block corresponding to the pending data block request; and select an alternative data block to transmit to the requester peer when the requester peer already has the data block corresponding to the pending data block request, wherein the alternative data block is a rare block.

In Example 22, the system of any one or more of Examples 13-21 are optionally configured such that the control module is configured to: determine whether a playback position of the requester peer is beyond a sequence number of a data block corresponding to the pending data block request; and select an alternative data block to transmit to the requester peer when the playback position of the requester peer is beyond the sequence number of the data block corresponding to the pending data block request, wherein the alternative data block is a rare block.

Example 23 describes a machine-readable medium including instructions, which when executed by a machine, cause the machine to access a list of peer computers, the list sorted by a data exchange metric; select a requester peer by traversing the list from a peer computer with a smallest data exchange metric to a peer computer with a largest data exchange metric to identify a peer computer with a pending data block request, the peer computer with the pending data block request being the requester peer and having an associated data exchange metric; and transmit a data block to the requester peer.

This section is intended to provide an overview of subject matter of the present application. It is not intended to provide an exclusive or exhaustive explanation of the inventive subject matter. The Detailed Description is included to provide further information about the present application.

BRIEF DESCRIPTION OF DRAWINGS

Some embodiments are illustrated by way of example and not limitation in the figures of the accompanying drawings in which:

FIG. 10 is a pseudo code listing of the PROCEDURE SENDTOPEER illustrating a method of transmitting a data block;

FIG. 11 is a pseudo code listing of the PROCEDURE SERVERREPLY illustrating a method of replying to a request for a data block;

FIG. 12 is a pseudo code listing of the PROCEDURE SERVERREPLYOPT illustrating another method of replying to a request for a data block.

Figure 1:
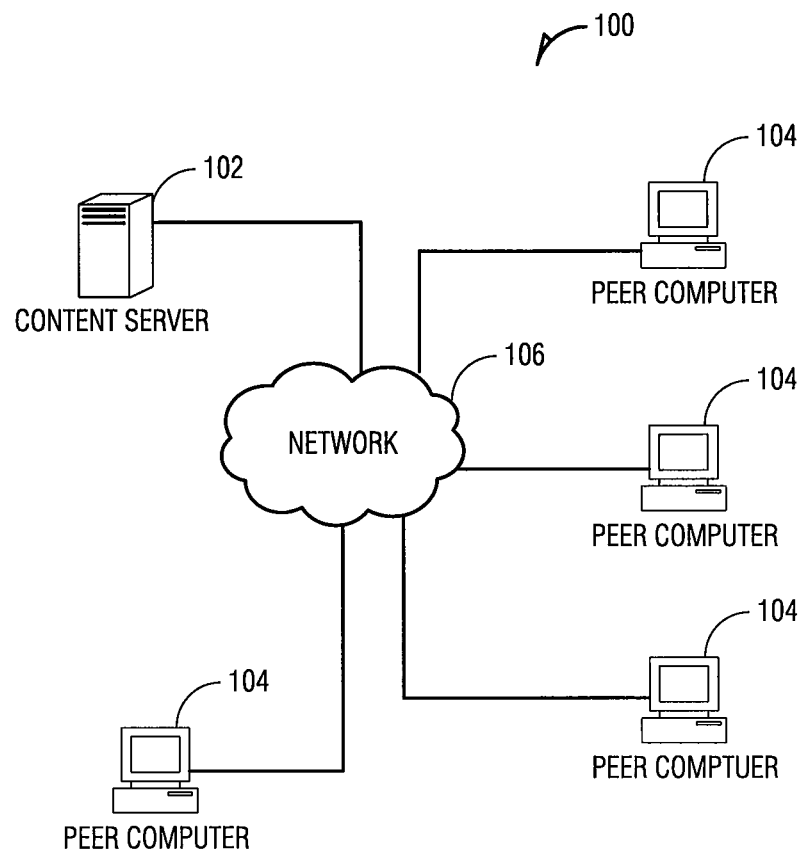
FIG. 1 is a schematic diagram illustrating an example of a peer-to-peer computer network.

In the drawings, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

Overview of Fairness in P2P Systems

The usage of Peer-to-Peer (P2P) file-sharing applications on the Internet has experienced explosive growth. Many users and businesses now rely on P2P file-sharing for distributing videos, software, and documents. P2P file-sharing applications are plagued by unfairness in how bandwidth among peers is used and allocated. Peers do not receive service commensurate with what they contribute to the system. Unfairness can cause many performance problems. Peers can be disincentivized from contributing more upload bandwidth. A growing number of free riders, e.g., peers who cap their upload bandwidth to zero or a small value, take as much as possible from the system while contributing little resources. Lack of real-time rewards for contributions can lead to poor performance, particularly in streaming applications.

Fair bandwidth allocation in P2P systems can be difficult to achieve for several reasons. First, bandwidth resources are distributed all over the Internet and belong to, and are controlled by, individual peers, not by a single party. Unlike a router or a server, there is no central entity to control or arbitrate access to resources. Second, the amount of bandwidth resources available is unknown in advance and peers cannot be relied upon to honestly provide their own resources. Third, bandwidth resources can vary over time for several reasons, such as network conditions, peers joining and leaving the system, mobile peers connecting at different access points, and users using available bandwidth for other activities. Finally, it is difficult to design a fair allocation mechanism that is strong enough to withstand attempts by free-riders and strategic peers to manipulate the system.

Several approaches have attempted to address the problem of fair bandwidth exchange. For example, one approach splits a peer's upload bandwidth equally among a subset of neighboring peers and adjusts this subset based on estimates of their bandwidth rates. This approach is referred to as a tit-for-tat (TFT) heuristic. Another approach is block-based TFT used by peers among one another, which augments TFT with hard limits on the amount of data one peer can owe another. In another approach, a peer's upload bandwidth is split among its neighbors in proportion to past estimates of its neighbors' bandwidth contributions.

BitTorrent employs a rate-based tit-for-tat (TFT) heuristic to incentivize peers to upload and to attempt to provide fair exchange of bandwidth between peers. Peers participating in the download of the same target file form a swarm. The target file is conceptually broken up into pieces (typically 256 KB). Peers tell one another which pieces of the target file they already have and request missing pieces from one another. Requests are typically made for 16 KB sub-pieces. Peers that already have the entire file are seeds. Peers that are still downloading pieces of the file are leechers. TFT is used in a swarm to attempt to enable fair bandwidth exchange during the current download of a file. It operates by having each BitTorrent client upload to N other peers in round-robin fashion, where N-k of the peers have provided the best download rate during the most recent time period, and k peers are randomly selected to help discover other peers with similar upload rates. (N is typically between 4 and 10). The set of peers to which a client uploads is periodically changed based on measurements of their download rates. BitTorrent refers to the selection and desel ection of a peer for uploading as unchoking and choking, respectively. These approaches are rate-based and suffer from a fundamental flaw.

Each approach assumes that neighbor peer rates measured over some arbitrary period of time provide accurate capacity estimates and are indicators of future bandwidth contributions. However, in practice, this assumption can be problematic, as both P2P bandwidth availability and consumption can vary substantially over time. This can result in significant problems with such rate-based approaches, including unfairness, potential exploitation by strategic clients, bandwidth underutilization, ad-hoc parameter tuning requirements, and poor performance.

This disclosure presents systems and methods that provide a deficit-based distributed P2P technique that addresses the problem of fair bandwidth exchange in the presence of free-riders and strategic peers.

In an example, peers are accurately rewarded in accordance with their respective contributions. A programmatic element, which can run locally at each peer, can maintain a deficit counter for each neighbor. The deficit counter can represent the difference between bytes sent and bytes received from a neighbor. When a peer is ready to upload a data block, the peer can send the data block to a peer with the largest deficit, that is, the peer to whom it "owes" the most data. Unlike other approaches, examples described herein can use a completely different mechanism that does not rely on express estimates of peer bandwidth. This can help avoid the bandwidth rate estimation problem that can plague other approaches. By selecting the neighbor with the largest deficit as the destination of the next data block, exampled described herein can act to reduce or minimize the difference between bytes sent and bytes received, thereby decreasing or minimizing unfairness at each step. This can result in a higher degree of fairness and performance for each peer that can be closely correlated with its contribution.

Examples of P2P networks described herein provide one or more advantages over other approaches, for example: (1) a P2P network can provide fair bandwidth allocation, e.g., operating only at individual peers, in a distributed manner that does not require any centralized control of peers or other P2P resources; (2) a P2P network can be resilient to strategic clients and free riders as they can choose to upload a block to a peer to whom it "owes" more data; (3) a P2P network can increase or maximize utilization of peers in the network, e.g., a peer can push toward a maximum upload capacity and can still receive a fair amount of bandwidth in return; (4) a P2P network can avoid the long peer discovery of other approaches, and even a high uploading peer can quickly discover a set of neighbors with which it can reach a fair data-exchange rate; (5) a P2P network can avoid a need to measure available download bandwidth, can allocate precise upload or download rates for any peers, or can rely on estimates or advanced knowledge of available bandwidth from users or other peers; (6) a P2P network can provide low variance in download rate, which can be important for streaming applications; (7) a P2P network does not need to have any "magic" parameters or require tuning, can be convenient to implement, and can be compatible with existing P2P clients, e.g., some examples may be implemented as an extension to existing P2P clients or networks (e.g., as a client in a BitTorrent network).

Example Systems And Methods of Operation

FIG. 1 is a schematic diagram illustrating an example of a peer-to-peer computer network 100. The peer-to-peer computer network 100 includes a content server 102 and two or more peer computers 104. The content server 102 is connected to the peer computers 104 via a network 106 (e.g., the Internet or Wide Area Network (WAN)).

When a content server 102 makes a file available to the peer-to-peer computer network 100, one or more peer computers 104 can connect and download at least a portion of the file. Each peer computer 104 that downloads a part of the file makes that part available to other peer computers 104 on the peer-to-peer computer network 100. After a file is fully downloaded to a particular peer computer 104, that particular peer computer 104 can become a seed computer and distribute portions of the file to other groups of peer computers 104. The distributed nature of peer-to-peer file sharing results in a viral data distribution throughout a network of peers. As more peers join the peer-to-peer computer network 100, they can obtain the file from previously-existing peers that have portions of the file or from peers that have the entire file (i.e., seeds). Peer-to-peer file sharing provides redundancy by reducing dependence on the original content server 102. In addition, distribution using a peer-to-peer network can increase download performance and reliability.

Some P2P system establish multiple simultaneous network connections with neighboring peers. In an example, a computer peer 104 in the peer-to-peer computer network 100 can establish TCP connections with up to 50 neighbors. This is similar to other P2P implementations like Azureus and Bit-Torrent. However, while Azureus and BitTorrent actively unchoke a limited set of peers at a time, the present system can unchoke any or all of the 50 neighbors that are interested in a peer's data. Referring to the BitTorrent protocol, a leecher $L_i$ will only receive requests from a leecher $L_j$ if $L_j$ if is interested in some data that $L_i$ has and $L_i$ has unchoked $L_j$. BitTorrent and Azureus only unchoke several peers at a time. This mechanism forces higher uploading peers to push at a higher rate to each unchoked peer. This results in allowing higher uploading peers to measure each other's rates and discover one another in a swarm, although such discovery is slow. Unfortunately, this means that low uploading peers can also detect high uploading peers and leech off their bandwidth.

In contrast, in the present system, leecher $L_i$ simply unchokes any neighbor $L_j$ that is interested in $L_i$'s data. The present system does not need to try to discover like-uploading peers as does BitTorrent. Instead, $L_i$ quickly finds enough peers such that the sum of their reciprocation rates is at least as high as $L_i$'s upload rate and $L_i$ can adapt to their rates. For example, in the present system, a high-capacity leecher surrounded by many low-capacity leechers can quickly adapt to exchange data at their respective rates. A lecher $L_i$ can end up exchanging at different rates with different peers.

A computer peer 104 can begin by moving along its randomly ordered list of peers and sending a block to each peer it has unchoked. As soon as one reciprocates, the computer peer 104 can send the reciprocating peer more blocks to match its rate. Peers can automatically attempt to increase or maximize reciprocation to one another by probing each other with more blocks. A high uploader can adapt quickly whether or not surrounded by other peers by running the systems and methods described herein.

In the peer-to-peer computer network 100 illustrated in FIG. 1, when several requesting peer computers 104 request data blocks from a responding peer computer 104, the responding peer computer 104 can use a deficit-based reply policy to determine which order to reply to the pending requests. For example, each peer computer 104 can keep track of its deficit with each neighbor. A deficit can be calculated determining the bytes sent to a particular neighbor minus the bytes receives from that neighbor. To decide which peer to respond to first, the responding peer computer 104 can select a peer with the largest deficit representing the peer to which the responding peer computer 104 "owes" the most data. A deficit-based reply policy is resilient to the free rider and strategic peer problems. This can help provide a good quality stream to a peer that contributes bandwidth at above the stream rate. The reply policy can be fully distributed and can be implemented individually at each peer.

In an example, each peer $p_i$ that implements such a reply policy can keep track of the deficit $d_{ij}$ with each peer $p_j$, where $d_{ij}$ represents the difference in the total number of bytes that $p_i$ has sent to $p_j$ and the bytes that $p_i$ received from $p_j$. Instead of replying to peers in first-come-first-served order, when $p_i$ has a number of pending requests it can elect to send the next block to a peer $p_j$ with the minimum value $d_{ij}$. Thus, peer $p_i$ can always seek to select a peer to which it "owes" the most data or conversely, a peer who "owes" it the least.

Upon receiving a block from pj, methods and systems described herein can check whether the block is valid, such as by checking its hash and, if it is a valid block, can increase the deficit $d_{ij}$ by the size of the block, where $d_{ij}$ is the deficit with peer $p_j$. When $p_i$ is ready to send another block of data (e.g., either based on its bandwidth capacity or the application upload bandwidth cap set by the user), peer $p_i$ can select a peer with the minimum value of $d_{ij}$ and a pending request. Then $p_i$ can send a block to $p_j$, and reduce the deficit $d_{ij}$ by the size of the block. This is further illustrated below in FIGS. 2-7.

Figures 2, 3:
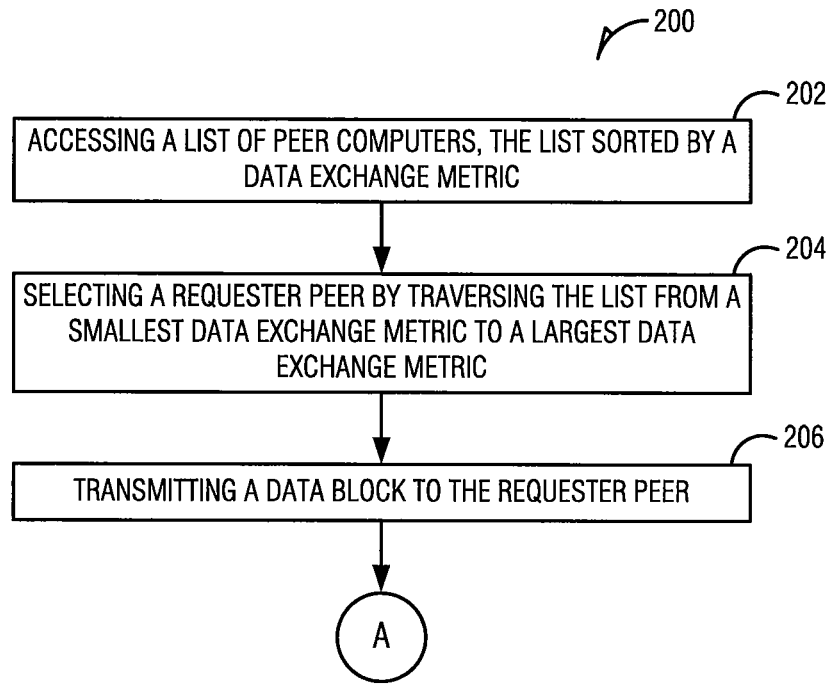
FIG. 2 is a flow chart illustrating a method of selectively transmitting data to a peer computer.
FIG. 3 is a table illustrating a sorted list of peers.

Referring now to FIG. 2. FIG. 2 is a flow chart illustrating a method 200 of selectively transmitting data to a peer computer. At 202, a list of peer computers is accessed. The list is sorted by a data exchange metric. In an example, the data exchange metric represents the difference between bytes sent to a peer computer and bytes received from the peer computer. The data exchange metrics are measured using actual values with "smallest" and "largest" referring to the relationship of the values on a number line. That is, a data exchange metric with a value of −30 is smaller than a data exchange metric with a value of −5. Similarly, a data exchange metric with a value of −5 is smaller than a data exchange metric of 10. The data exchange metric may be discussed in terms of a "deficit." In such a case, a large deficit indicates a small actual value, and a small deficit indicates a large actual value. A negative deficit can be referred to as a surplus. Thus, the data exchange metrics can be referred to in terms of deficits, surpluses, or actual values.

FIG. 3 is a table 300 illustrating a sorted list of peers. Using an example where data block are 16 kilobytes, "PEER_8" is first in the list having a deficit of 128 KB (i.e., 8 data blocks). Other peers in the table 300 have provided less data relative to the amount transmitted to them.

Referring again to FIG. 2, at 204, a requester peer is selected by traversing the list from a largest data exchange metric to a smallest data exchange metric. In the example of FIG. 3, PEER_8 would be considered first. It is possible that two or more peers have the same data exchange metric. When this situation occurs, one or more mechanisms can be used to resolve priority. For example, a first-in-first-out queue can be maintained such that the first peer to obtain the data exchange metric would have priority against other peers who arrive at the same metric. As another example, a peer can be chosen at random. A random selection is useful when a peer is just beginning transmissions and has little or no history of transactions with adjacent peers. As another example, the amount of transmitted data can be tracked so that the peer with the most data transmitted to the responding peer has priority. The amount of transmitted data can be evaluated over a particular period of time, such that a peer that has transmitted less data but more recently may have a higher priority than a peer that has transmitted more data but farther in the past. Various aging protocols can be used to determine priority in these cases. In addition, the time period can be a moving window of time or a fixed period. For example, transmitted data can be calculated from a starting date and time up to the present time. As another example, transmitted data can be recalculated using a 24-hour moving window.

In another example, the list of peers is not sorted or maintained. Instead, the list can be scanned to determine a requester peer or peers with a lowest data exchange metric. There is a trade off using this mechanism. Instead of resorting the list and then traversing it, which has a logarithmic or loglinear computational cost, a full scan has a linear computational cost.

In an example, among peers with equal values and pending requests for data, the present system can break ties as follows. First, it can select a peer that transmitted the most data to the local peer. This can protect the system against whitewashers—strategic peers that repeatedly enter the system with new identities and no data exchange metric in order to achieve priority queuing. If there is more than one peer with the same data exchange metric, the system can select a peer based on a random ordering of neighbors. An example of a tie-breaking mechanism is illustrated in FIG. 4.

Figure 4:
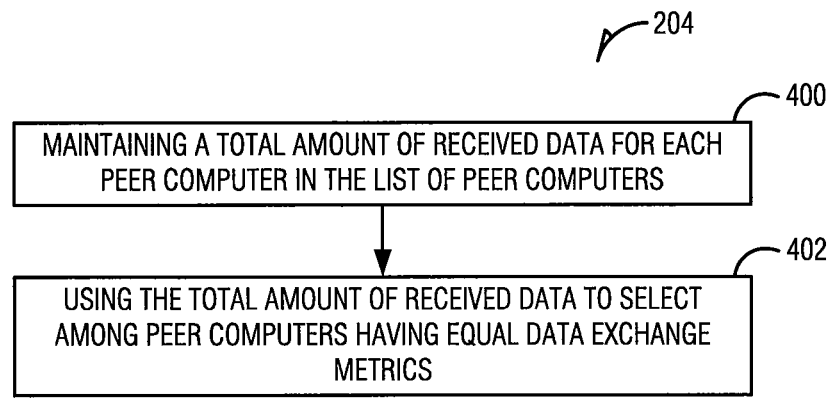
FIG. 4 is a flow chart illustrating a method of selecting a requester peer.

FIG. 4 is a flow chart illustrating a method 204 of selecting a requester peer. At 400 a total amount of received data for each peer computer in the list of peer computers is maintained. As discussed above, the total amount of received data can be calculated based on a fixed or moving period of time.

At 402, the total amount of received data is used to select among peer computers having equal data exchange metrics. In an example, a peer is selected from the peer computers having equal data exchange metrics by determining the peer computer having a largest total amount of transmitted data to the sending peer.

After selecting a requester peer, in an example, it is determining whether the requester peer is able to receive the data block. Peers have a finite data buffer. As such, after selecting a potential peer to transmit a data block to, the transmitting peer can first check to ensure that there is room in the receiving peer's buffer to receive the data block. When there is sufficient room, then the data block is transmitted. When there is insufficient room, in an example, an alternative peer is chosen. This mechanism increases or maximizes the upload bandwidth of the transmitting peer and reduces idle time. In an example, the table 300 (FIG. 3) is referred to again to obtain an alternative peer to send a data block.

Figure 5:
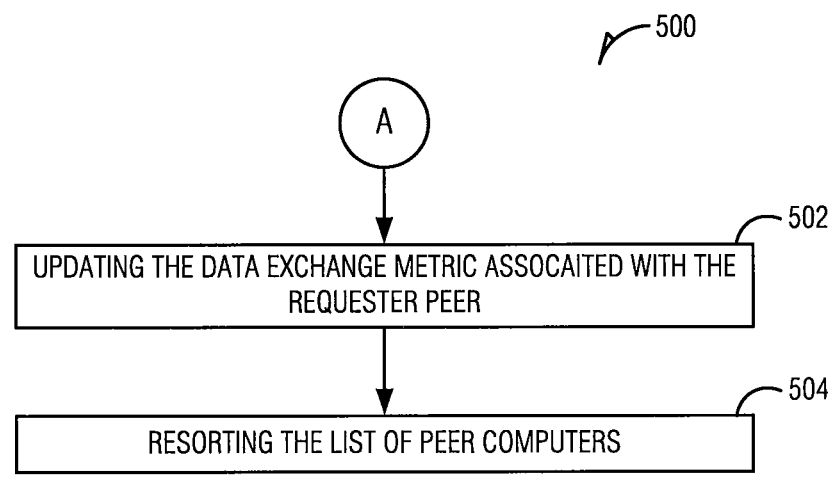
FIG. 5 is a flow chart illustrating a method of tracking peer computers.

After transmitting a data block to a peer, the transmitting peer updates its records. FIG. 5 is a flow chart illustrating a method 500 of tracking peer computers. At 502, the data exchange metric associated with the requester peer is updated. In particular, in an example, the peer-to-peer data exchange metric is adjusted by the size of the data block transmitted to the requester peer. In an example, the size in kilobytes is added to the data exchange metric.

At 504, the list of peer computers is resorted. The list is resorted according to the updated data exchange metric. In an example, the requester peer is removed from the list. Then, after updating the data exchange metric, the requester peer is inserted into the list based on the updated data exchange metric. In an example, changes to data exchange metrics are maintained and the list is resorted periodically. For example, the list can be resorted prior to transmitting a block, but otherwise the data exchange metrics are only updated based on received data blocks. This mechanism can preserve extraneous processing when a peer's upload rate is different from its download rate. For example, when a peer uploads a block at one-fifth the rate that it downloads blocks from other peers, the list can be resorted one-fifth as many times, thus reducing computational overhead while preserving the data exchange-based priority mechanism.

In addition, as the responding peer receives data blocks from other peers in the network, the data exchange metrics are revised to reflect the data received. When the list is resorted, any peers that have sent data may change positions in the list relative to other peers. In an example, the list can be resorted after each update to a peer's data exchange metric (e.g., after receipt of a data block). In another example, the list is resorted at specific times, such as when a transmitting peer is determining a peer to respond to or on a periodic or regular basis. By reducing the number of resorting operations to specific times, additional efficiencies can be gained.

There are several other processes that can be used to streamline and improve the processing of data block requests. For example, while a peer can exist in a sorted list of peers who have transacted with the transmitting peer, there is no guarantee that the peer actually has an outstanding request for data from the transmitting peer or that the data would still be relevant should it be transmitted to the requesting peer. For example, in a streaming application data can become irrelevant when the requesting peer's playback position is beyond the sequence number of the data block that was requested previously in time.

Figure 6:
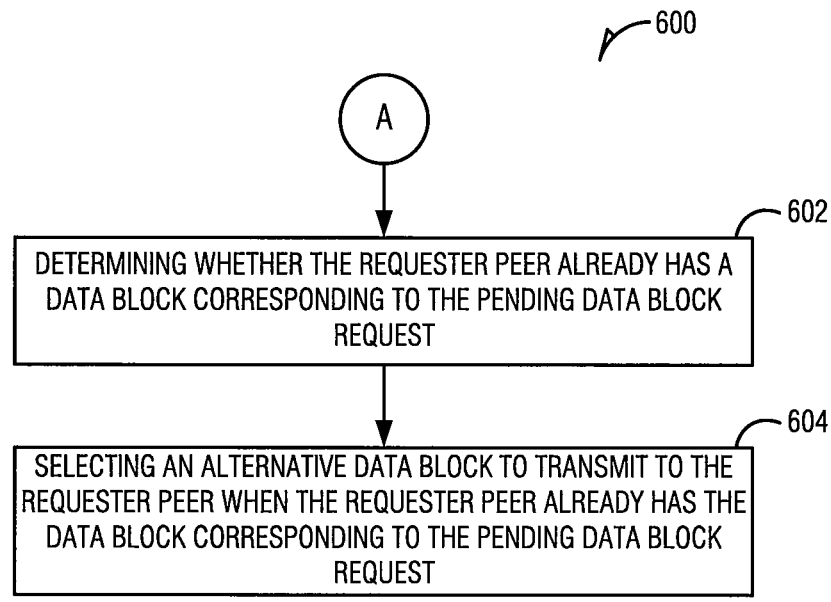
FIG. 6 is a flow chart illustrating a method 500 of selectively transmitting an alternative data block to a peer computer under certain conditions.

FIG. 6 is a flow chart illustrating a method 500 of selectively transmitting an alternative data block to a peer computer under certain conditions. At 602, it is determined whether the requester peer already has a data block corresponding to the pending data block request.

At 604, when the requester peer al has the data block corresponding to the pending data block request, an alternative data block is selected to transmit. In example, a rare data block is identified to be transmitted. A rare block includes a block that is found on fewer computer peers than other blocks.

Figure 7:
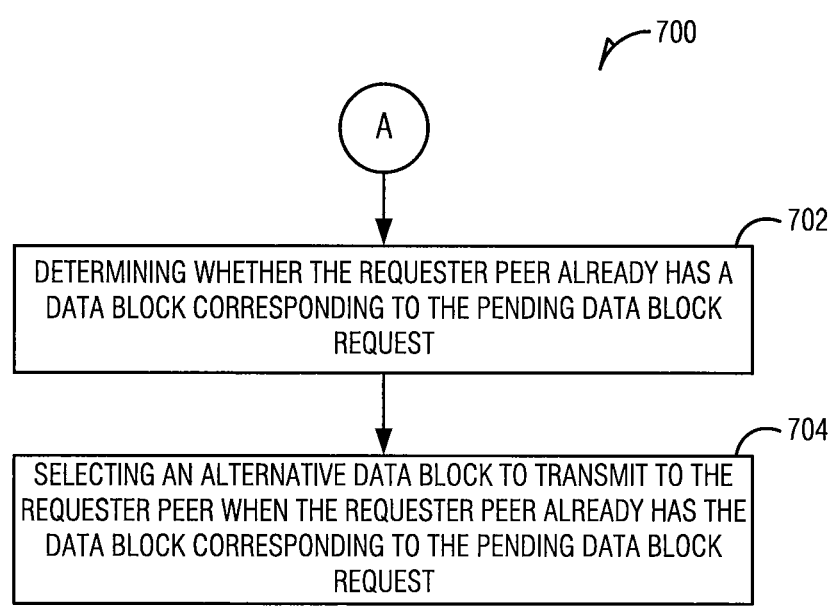
FIG. 7 is a flow chart illustrating a method of selectively transmitting an alternative data block to a peer computer under certain conditions.

FIG. 7 is a flow chart illustrating a method 600 of selectively transmitting an alternative data block to a peer computer under certain conditions. At 702, it is determined whether a playback position of the requester peer is beyond a sequence number of a data block corresponding to the pending data block request.

At 704, when the playback position of the requester peer is beyond the sequence number of the data block corresponding to the pending data block request, an alternative data block is selected to transmit. In example, a rare data block is identified to be transmitted.

Referring again to FIG. 2, at 206, a data block is transmitted to the requester peer selected at 204.

For streaming applications, an efficient request and buffering policy is important to maintain uninterrupted playback of a data stream. When a peer computer 104 joins a stream, it can fix its starting position at the highest sequence-numbered block it observes from its neighbors. The new peer computer 104 can begin buffering at that position. Once the peer computer 104 accumulates a specified amount (e.g., 90%) of data in a specified length buffer (e.g., a 30-second buffer window), the peer computer 104 can begin playing the stream.

While playing the stream, the peer computer 104 can maintain a sliding interest window, which can start at the position of the last-played data block and be sized in relation to the buffer (e.g., a 30-second interest window). The peer computer 140 can make requests for the missing data blocks inside this interest window. In an example, the computer peer 104 can randomly request missing blocks from the interest window.

This type of request policy can be more fault-tolerant then a rarest-first policy, such as in the presence of free-riders or malicious peers. Using rarest-first, a peer can assume that it can download blocks from its free-riding neighbors and can request other least commonly available blocks. In reality, however, the free-riders' blocks are not available to the peer. Using a random request policy can allow "well-behaved" peers to avoid this false assumption and can evenly spread out requests for missing blocks.

When in buffering mode, in an example, a computer peer 104 can request blocks exclusively from the interest window (e.g., inside the buffer), such as to complete buffering as quickly as possible. In an example of this mode, the computer peer 104 can make multiple requests for each block from its neighbors, while maintaining the same number of outstanding requests for each missing block.

In a playback mode, a computer peer 104 can also make duplicate requests for the blocks in its interest window. Since the data blocks of a stream has a playback deadline, P2P streaming systems can re-request missing blocks to improve the probability of receiving a given block by its deadline. Another approach, for example, can use a short timeout and can repeat a request for a missing block every few seconds. However, in the presence of peers with variable capacity many of those requests could be going to peers with little or no upload bandwidth (e.g., free-riders). To improve the probability of success, in an example, a computer peer 104 can send duplicate requests to other computer peers 104 with low average response times. Response times can be measured as the time between sending a request to a peer and receiving a reply.

Figures 8, 9:
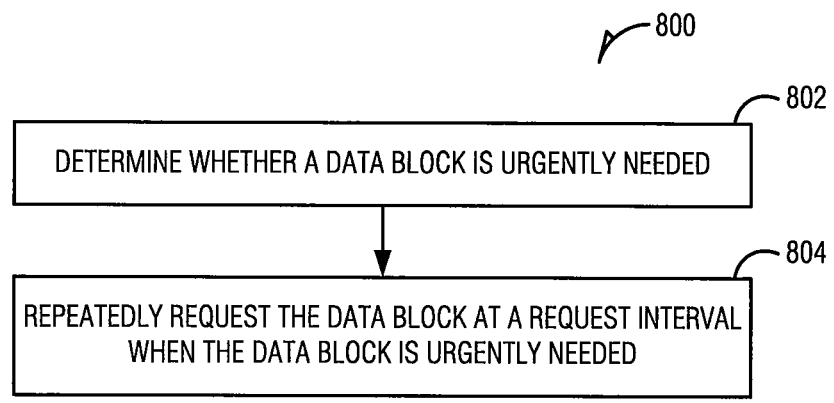
FIG. 8 is a flow chart illustrating a method of preemptively requesting a data block.
FIG. 9 is a pseudo code listing of the PROCEDURE RE-REQUEST illustrating a method of managing urgent requests.

FIG. 8 is a flow chart illustrating a method 800 of preemptively requesting a data block. At 802, it is determined whether a data block is urgently needed. In an example, a data block is urgently needed when it is within half the interest window size away from its playback deadline. For example, with an interest window size of 30 seconds, a data block with a playback deadline of less than 15 seconds is considered one that is urgently needed.

At 804, when the data block is urgently needed, the data block is repeatedly requested at a request interval. When making a request, the method 800 can select a peer with the best average response time. In addition, the method 800 can remove those peers that have another urgent request in its request queue. If the peer is handling a non-urgent request, that request can be preempted, by the urgent request. For example, the replying peer can replace the pending request with the urgent request received from the requester).

In an example, a process can run once a second and to implement the preemptive re-request policy. FIG. 9 is a pseudo code listing of the PROCEDURE RE-REQUEST illustrating a method of managing urgent requests. Referring to FIG. 9, the call to GETURGENTBLOCKS can return the list of blocks in the next half-interest window that have not yet been received. For each such block, the peer can make a preemptive re-request every request_interval seconds. The function SELECTBESTPEER can select the peer with the best average response time that does not have a pending urgent request. The response time can be measured as the time between the request sent and reply received from a peer. The function REQUESTFROMPEER can submit a request to peer $p_j$ with an indication that the request is urgent. In an example, REQUESTFROMPEER can return a code indicating whether the remote peer is able to handle the urgent request. If the remote peer is unable to handle the request, another peer is chosen. In an example, a request-interval of 5 seconds is used and allows a block to be re-requested a few times before its deadline.

While making duplicate requests can increase the probability of receiving a block, it can also end up generating duplicate replies and wasting bandwidth. To reduce the probability of sending a duplicate reply, in an example, the system can use an improved or optimized reply policy.

FIG. 10 is a pseudo code listing of the PROCEDURE SENDTOPEER illustrating a method of transmitting a data block. Referring to FIG. 10, a replying peer p, can execute this procedure before it replies to a peer $p_j$, such as to find a different block to send to $p_j$ in case the block that $p_j$ had requested is no longer useful to $p_j$. In particular, if $p_i$ determines that the requesting peer already has the requested block or that the current playback position of the peer is already beyond the sequence number of the requested block, $p_i$ chooses the rarest-first block that the peer does not have. The function CHOOSERAREST can select the rarest block b among the peers of $p_i$, with sequence numbers above that of block b. This can reduce the probability of a peer receiving duplicate copies of the same block.

This technique can require each peer to advertise its playback position and blocks in its possession. In an example, a peer can send a CURPOS message to its neighbors at regular intervals, such as once per second, to advertise its current position. Also, upon downloading a block, in an example, peers can send a HAVE message to its neighbors to announce the block sequence numbers it currently has.

As long asp, has upload capacity, it is in the interest of the peer to send a more optimal block to $p_j$ instead of not sending anything at all. Based on the fairness properties as provided by the systems and methods described herein, such behavior improves the probability of getting more reward from $p_j$ in the future.

While much of the discussion thus far has focused on peers and clients in the peer-to-peer computer network 100, content servers 102 and seeds do not download from peers in a swarm. As such, using data exchange metrics to allocate upload bandwidth from a seed is of limited utility. In an example, the peer-to-peer computer network 100 can allocate seed bandwidth split evenly among lechers, for example by using a round robin mechanism.

In a streaming peer-to-peer distribution network, similar to the client, a content server 102 or seed can announce new blocks that it streams via HAVE messages. Like a pull-based design, a content server can passively reply to pull requests from its neighboring peers. A content server 102 or seed need not use the reply policy used by the peers since it is not trying to compete for user bandwidth. Instead, it can allocate its bandwidth evenly among its neighbors and can serve requests via round-robin.

The content server 102 or seed need not be completely passive, as it can also have a goal of distributing all of the stream updates to the computer peers. To accomplish this, the content server 102 or seed can sometimes ignore a client request and can instead reply with a block that has not yet been streamed.

FIG. 11 is a pseudo code listing of the PROCEDURE SERVERREPLY illustrating a method of replying to a request for a data block. Referring to FIG. 11, if the rarest block returned by ABSOLUTERAREST BLOCK has not yet been streamed (e.g., it has not been replicated to any of the server's neighbors), the server can stream that block instead of the one that is being requested.

A Best-Peers technique can be included in the server technique, such as to use the server bandwidth more optimally in the face of free-riders. In an example, if a block b is only sent by the server to free-riders, the block will never be distributed to other peers. Even if the server streams each block to a fixed percentage of randomly selected clients, it may still get unlucky with some blocks and send them exclusively to free-riders. For example, if the server has enough upload capacity to stream each block three times, and there are 112 free-riders among the users, then on average each block has the probability of ⅛ of going only to free-riders. Thus, it is expected that sharing users will miss 12.5% of the updates.

More generally, if there is any fraction of free-riders, and the bandwidth of the server is limited, there is a nonzero chance that some blocks will not be distributed outside of free-riders, and thus will not be propagated to other users. This problem can be especially acute in streaming, as compared to file-sharing. In file-sharing, a missing block can eventually be requested from a content server or a seed. However, in streaming each block has a limited window of usefulness. Thus, the problem of effective server-bandwidth allocation in streaming can be important.

In an example, the peer-to-peer computer network 100 can include a technique called Best-Peers that need not require reputation or any a priori knowledge at the server, and that still can significantly improve the server capacity utilization despite a large fraction of free-riders.

Using this technique, when a peer p, makes a request to the streaming server it includes in its request a set S $p_i$ of up to k of its best neighbors. These best peers are selected by $p_i$ as the peers with the best average download response times that $p_i$ observes. For a sharing peer, this set would represent peers that are not free-riders and that it is actively downloading data from. When the server replies to $p_i$ it sends back a block that is specifically missing from the set of $p_i$'s effective neighbors.

This technique can allow the server to use its bandwidth more effectively. With this technique, the server can be less likely to send duplicate blocks to the sharing peers. Thus, the sharing peers can be more likely to receive all of the blocks in the stream. This is because the server can assess what is missing not only at the requesting peer, but at the whole neighborhood of the peer, and can respond by not sending duplicate blocks to that neighborhood.

FIG. 12 is a pseudo code listing of the PROCEDURE SERVER-REPLYOPT illustrating another method of replying to a request for a data block. Referring to FIG. 12, one can further modify a server's reply policy to look for a globally-missing block first before looking for the missing blocks in the peer-supplied set. The reason is that a globally-missing block is also missing from the peer's supplied set, while the reverse is not always true. If the server looks at the peer's set first, it can end up sending the same block more than once to disjoint sets supplied by different peers.

With this modification, the server does not need to trust the requesting peer. The server can be assured that a sharing peer will want to truthfully report its set $S_{pi}$, as it is in the interest of each sharing peer to help the server to distribute more unique blocks to the pool of sharing peers.

Also, it does not matter how the malicious peers may try to sabotage the requests, such as by providing false neighborhood sets or mis-advertising blocks that they do or do not have. It can be assumed that all of the replies by the server to malicious peers are useless and are wasted. Even with that assumption, because a sharing peer only sends the set of its "best" peers (e.g., peers with whom it is actively exchanging data and from whom it observes best response times), the server can only use the provided best peers to determine a more unique block in the peer's neighborhood.

Note that this technique is not a reputation-based technique and can be more resistant to malicious peers misrepresenting other peers' reputation. In an example of this approach, the server does not use the information from one peer's reply to another. It can directly use the information from $p_i$ to reply to $p_i$.

The server may not be neighbors with some or all of the peers in the set $S_{Pi}$ and thus may not know what blocks they are missing. As a hint to the server, $p_i$ can add a set of blocks missing among her k best peers. It can be more optimal for the server to make the decision about the missing block because it can delay making that decision until reply time and thus avoid sending a duplicate if the requested block already arrived in the neighborhood of $p_i$. However, the peer $p_i$ can be configured for that case as well, such as by sending frequent preemptive re-requests to the server with more up-to-date information until the server replies.

In an example, the peer-to-peer computer network 100 can use a 16 KB block size. This is consistent with the unit of playback in other platforms. The peer-to-peer computer network 100 need not break this block into smaller transmission units; the peer-to-peer computer network 100 system can incur smaller overhead due to HAVE messages exchanged between neighbors. The peer-to-peer computer network 100 can allow each peer to connect to 50 neighbors selected at random. Especially in the presence of free-riders and malicious peers, the larger neighborhood size can allow a peer to discover other sharing neighbors more quickly. In an example, each peer can queue at most one request to each peer. In this example, a peer does not need to "wait" on more than one request toward a slow or free-riding peer.

Hardware Platform

Figure 13:
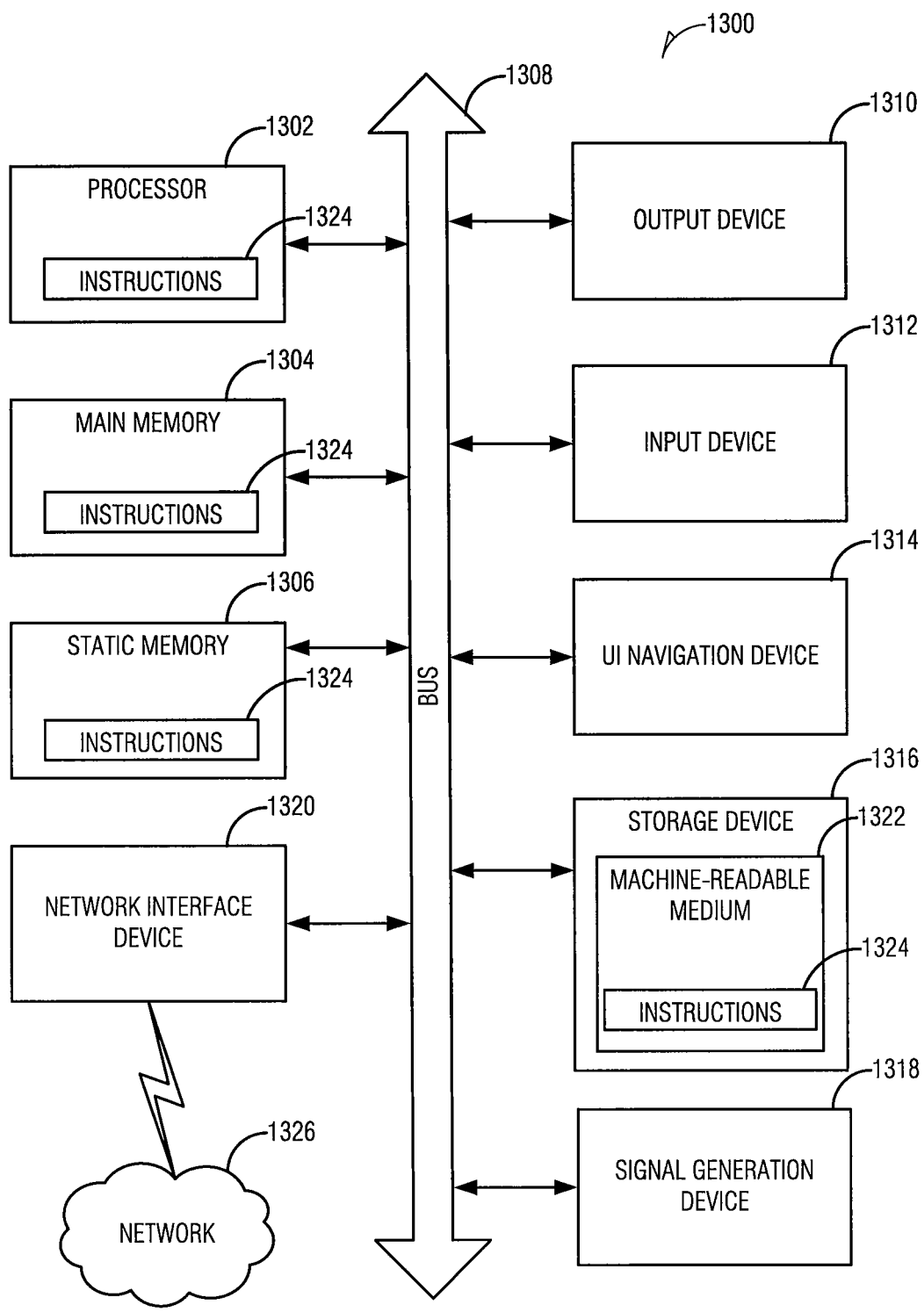
FIG. 13 is a block diagram of a machine, in accordance with an example, in the form of a computer system within which a set of instructions, for causing the machine to perform any one or more of the methodologies discussed herein, may be executed.

FIG. 13 is an example machine 1300. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that can be employed to create one or more software programs designed to implement and perform the methods disclosed herein. The programs can be structured in an object-orientated format using an object-oriented language such as Java or C++. Alternatively, the programs can be structured in a procedure-orientated format using a procedural language, such as assembly or C. The software components can communicate using any of a number of mechanisms well known to those of ordinary skill in the art, such as application program interfaces or interprocess communication techniques, including remote procedure calls. The teachings of various embodiments are not limited to any particular programming language or environment.

Thus, other embodiments can be realized. For example, an article of manufacture, such as a computer, a memory system, a magnetic or optical disk, some other storage device, and/or any type of electronic device or system can include one or more processors 1302 coupled to a machine-readable medium 1322 such as a memory (e.g., removable storage media, as well as any memory including an electrical, optical, or electromagnetic conductor) having instructions 1324 stored thereon (e.g., computer program instructions), which when executed by the one or more processors 1302 result in performing any of the actions described with respect to the methods above.

The machine 1300 can take the form of a computer system having a processor 1302 coupled to a number of components directly, and/or using a bus 1308. Such components can include main memory 1304, static or non-volatile memory

1306, a mass storage device 1316, and a signal generation device 1318 (e.g., a speaker). Other components coupled to the processor 1302 can include an output device 1310, such as a video display, an input device 1312, such as a keyboard, and a user interface navigation device 1314, such as a mouse. A network interface device 1320 to couple the processor 1302 and other components to a network 1326 can also be coupled to the bus 1308. The instructions 1324 can further be transmitted or received over the network 1326 via the network interface device 1320 utilizing any one of a number of well-known transfer protocols (e.g., HTTP). Any of these elements coupled to the bus 1308 can be absent, present singly, or present in plural numbers, depending on the specific embodiment to be realized.

The processor 1302, the memories 1304, 1306, and the storage device 1316 can each include instructions 1324 which, when executed, cause the machine 1300 to perform any one or more of the methods described herein. In alternative embodiments, the machine 1300 operates as a standalone device or can be connected (e.g., networked) to other machines. In a networked environment, the machine 1300 can operate in the capacity of a server or a client machine in server-client network environment, or as a peer machine in a peer-to-peer (or distributed) network environment. The machine 1300 can be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine 1300 is illustrated, the term "machine" shall also be taken to include any collection of machines that individually or jointly execute a set (or multiple sets) of instructions to perform any one or more of the methodologies discussed herein.

While the machine-readable medium 1322 is shown as a single medium, the term "machine-readable medium" should be taken to include a single medium or multiple media (e.g., a centralized or distributed database, and/or associated caches and servers, and or a variety of storage media, such as the processor 1302 registers, memories 1304, 1306, and the storage device 1316) that store the one or more sets of instructions 1324. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to tangible media, such as solid-state memories, optical, and magnetic media.

Additional Notes

The above Detailed Description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile computer-readable media during execution or at other times. These computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Accordingly, the specification and drawings are to be regarded in an illustrative rather than a restrictive sense. Combinations of the above embodiments, and other embodiments not specifically described herein, will be apparent to those of ordinary skill in the art upon reviewing the above description. This Detailed Description, therefore, is not to be taken in a limiting sense, and the scope of various embodiments is defined only by the appended claims, along with the full range of equivalents to which such claims are entitled. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A computer-implemented method comprising:
    accessing, by a transmitter peer, a list of peer computers each having a respective data exchange metric, the list created, stored, and maintained at the transmitter peer, the list including peers with which the transmitter peer has had at least one transaction, and the list including at least one peer with a data block request and at least one peer without a data block request, the data exchange metric for each respective peer computer representing the difference between bytes sent to a respective peer computer from the transmitter peer and bytes received from the respective peer computer at the transmitter peer, and the list sorted by the data exchange metric from the greatest deficit to the least deficit;
    selecting, by the transmitter peer, a requester peer by traversing the list to identify a peer computer with a pending data block request, the peer computer with the pending data block request being the requester peer and having an associated data exchange metric, wherein selecting the requester peer comprises:
    maintaining a total amount of received data associated with each peer computer in the list of peer computers; and
    using the total amount of received data to select among a plurality of peer computers having equal data exchange metrics by selecting from the plurality of peer computers having equal data exchange metrics a peer computer having a largest total amount of transmitted data; and
    transmitting a data block to the requester peer from the transmitter peer.

2. The computer-implemented method of claim 1, wherein selecting the requester peer comprises determining whether the requester peer is able to receive the data block, and wherein transmitting the data block comprises transmitting the data block to the requester peer when the requester peer is able to receive the data block.

3. The computer-implemented method of claim 1, comprising:
    updating the data exchange metric associated with the requester peer to provide an updated data exchange metric for the requester peer; and
    resorting the list of peer computers.

4. The computer-implemented method of claim 3, wherein updating the data exchange metric comprises:
    adjusting the data exchange metric by the size of the data block transmitted to the requester peer.

5. The computer-implemented method of claim 3, wherein resorting the list of peer computers comprises:
    removing the requester peer from the list; and
    inserting the requester peer into the list based on the updated data exchange metric.

6. The computer-implemented method of claim 1, comprising:
    determining whether the requester peer already has a data block corresponding to the pending data block request; and
    selecting an alternative data block to transmit to the requester peer when the requester peer already has the data block corresponding to the pending data block request.

7. The computer-implemented method of claim 6, wherein selecting the alternative data block comprises:
    identifying a rare data block.

8. The computer-implemented method of claim 1, comprising:
    determining whether a playback position of the requester peer is beyond a sequence number of a data block corresponding to the pending data block request; and
    selecting an alternative data block to transmit to the requester peer when the playback position of the requester peer is beyond the sequence number of the data block corresponding to the pending data block request.

9. The computer-implemented method of claim 8, wherein selecting the alternative data block comprises:
    identifying a rare data block.

10. A transmitter peer system comprising:
    a memory; and
    a processor coupled to the memory, the processor configured to:
    access a list of peer computers each having a respective data exchange metric, the list created, stored, and maintained in the memory at the transmitter peer, the list including peers with which the transmitter peer has had at least one transaction, and the list including at least one peer with a data block request and at least one peer without a data block request, the data exchange metric for each respective peer computer representing the difference between bytes sent to a respective peer computer from the transmitter peer and bytes received from the respective peer computer at the transmitter peer, and the list sorted by the data exchange metric from the greatest deficit to the least deficit;
    select a requester peer by traversing the list to identify a peer computer with a pending data block request, the peer computer with the pending data block request being the requester peer and having an associated data exchange metric, and to select the requester peer by:
    maintaining a total amount of received data associated with each peer computer in the list of peer computers and using the total amount of received data to select among a plurality of peer computers having equal data exchange metrics by selecting from the plurality of peer computers having equal data exchange metrics a peer computer having a largest total amount of transmitted data; and
    transmit a data block to the requester peer.

11. The system of claim 10, wherein the processor is configured to:
    select the requester peer by determining whether the requester peer is able to receive the data block, and
    transmit the data block by transmitting the data block to the requester peer when the requester peer is able to receive the data block.

12. The system of claim 10, wherein the processor is configured to:
    update the data exchange metric associated with the requester peer to provide an updated data exchange metric for the requester peer; and
    resort the list of peer computers.

13. The system of claim 12, wherein the processor is configured to update the data exchange metric by:
    adjusting the data exchange metric by the size of the data block transmitted to the requester peer.

14. The system of claim 12, wherein the processor is configured to resort the list of peer computers by:
    removing the requester peer from the list; and
    inserting the requester peer into the list based on the updated data exchange metric.

15. The system of claim 10, wherein the processor is configured to:

determine whether the requester peer already has a data block corresponding to the pending data block request; and select an alternative data block to transmit to the requester peer when the requester peer already has the data block corresponding to the pending data block request, wherein the alternative data block is a rare block.

16. The system of claim 10, wherein the processor is configured to:

determine whether a playback position of the requester peer is beyond a sequence number of a data block corresponding to the pending data block request; and select an alternative data block to transmit to the requester peer when the playback position of the requester peer is beyond the sequence number of the data block corresponding to the pending data block request, wherein the alternative data block is a rare block.

17. A non-transitory machine-readable medium including instructions, which when executed by a transmitter peer, cause the transmitter peer to:

access a list of peer computers each having a respective data exchange metric, the list created, stored, and maintained at the transmitter peer, the list including peers with which the transmitter peer has had at least one transaction, and the list including at least one peer with a data block request and at least one peer without a data block request, the data exchange metric for each respective peer computer representing the difference between bytes sent to a respective peer computer from the transmitter peer and bytes received from the respective peer computer at the transmitter peer, and the list sorted by the data exchange metric from the greatest deficit to the least deficit;

select a requester peer by traversing the list to identify a peer computer with a pending data block request, the peer computer with the pending data block request being the requester peer and having an associated data exchange metric, wherein to select the requester peer includes instructions to:

maintain a total amount of received data associated with each peer computer in the list of peer computers; and use the total amount of received data to select among a plurality of peer computers having equal data exchange metrics by selecting from the plurality of peer computers having equal data exchange metrics a peer computer having a largest total amount of transmitted data; and transmit a data block to the requester peer.

* * * * *